US011555516B2

(12) United States Patent
Kuroda

(10) Patent No.: US 11,555,516 B2
(45) Date of Patent: Jan. 17, 2023

(54) BALL JOINT AND STABILIZER LINK USING SAME

(71) Applicant: NHK SPRING CO., LTD., Kanagawa (JP)

(72) Inventor: Shigeru Kuroda, Kanagawa (JP)

(73) Assignee: NHK SPRING CO., LTD., Kanagawa (JP)

(*) Notice: Subject to any disclaimer, the term of this patent is extended or adjusted under 35 U.S.C. 154(b) by 1116 days.

(21) Appl. No.: 16/084,550

(22) PCT Filed: Mar. 7, 2017

(86) PCT No.: PCT/JP2017/009031
§ 371 (c)(1),
(2) Date: Sep. 12, 2018

(87) PCT Pub. No.: WO2017/159458
PCT Pub. Date: Sep. 21, 2017

(65) Prior Publication Data
US 2019/0070920 A1 Mar. 7, 2019

(30) Foreign Application Priority Data
Mar. 14, 2016 (JP) .............................. JP2016-050213

(51) Int. Cl.
*F16C 11/06* (2006.01)
*B60G 7/00* (2006.01)

(52) U.S. Cl.
CPC .......... *F16C 11/0638* (2013.01); *B60G 7/005* (2013.01); *B60G 2204/416* (2013.01); *Y10T 403/32737* (2015.01)

(58) Field of Classification Search
CPC .............. B60G 7/005; B60G 2204/416; F16C 11/0623; F16C 11/0628; F16C 11/0633;
(Continued)

(56) References Cited

U.S. PATENT DOCUMENTS 4,615,638 A * 10/1986 Ito ....................... F16C 11/0638
403/135
4,695,181 A 9/1987 Rahmede et al.
(Continued)

FOREIGN PATENT DOCUMENTS

DE 1168174 B * 4/1964 .......... F16C 11/0633
EP 2722540 A1 4/2014
(Continued)

OTHER PUBLICATIONS

Supplementary European Search Report issued in corresponding European patent application No. EP 17 76 6459, dated Oct. 8, 2019.
(Continued)

*Primary Examiner* — Josh Skroupa
(74) *Attorney, Agent, or Firm* — Day Pitney LLP; Anthony A. Kassas

(57) ABSTRACT

A ball joint comprises: a ball stud which includes a stud part on one end side connected to a structure and a ball part on the other end side; a housing which oscillatably and rotatably supports the ball part of the ball stud; and a ball sheet disposed between the housing and the ball part. The ball sheet includes a recessed/protruding part formed of at least one of a recessed portion and a protruding portion on a surface facing the housing. The housing includes a fitting part having at least one of a protruding shape and a recessed shape each of which fits to the recessed/protruding part.

6 Claims, 11 Drawing Sheets

(58) Field of Classification Search
CPC .............. F16C 11/0638; F16C 11/0647; F16C 11/0657; F16C 11/0661; F16C 11/0685; F16C 2220/04; F16C 2220/06; F16C 2326/05; Y10T 403/32655; Y10T 403/32713; Y10T 403/32721; Y10T 403/32737
USPC .................................. 403/125, 132, 133, 135
See application file for complete search history.

(56) References Cited

U.S. PATENT DOCUMENTS

| | | | | |
|---|---|---|---|---|
| 4,995,755 | A * | 2/1991 | Hyodo | F16C 11/0609 403/133 |
| 5,188,476 | A * | 2/1993 | Mori | F16C 11/0638 403/133 |
| 5,368,408 | A * | 11/1994 | Shimizu | F16C 11/0638 403/133 |
| 6,092,954 | A * | 7/2000 | Mizutani | F16C 11/0638 403/132 |
| 6,164,861 | A * | 12/2000 | Maughan | F16C 11/0638 403/133 |
| 6,821,047 | B2 * | 11/2004 | Broker | F16C 11/0638 403/132 |
| 8,152,186 | B2 * | 4/2012 | Jeong | F16C 11/0638 403/132 |
| 2007/0274770 | A1 | 11/2007 | Sagisaka et al. | |
| 2008/0138150 | A1 | 6/2008 | Budde et al. | |
| 2014/0131970 | A1 | 5/2014 | Kuroda | |
| 2015/0063899 | A1 | 3/2015 | Sato et al. | |

FOREIGN PATENT DOCUMENTS

| | | |
|---|---|---|
| JP | S54-68075 U | 5/1979 |
| JP | S55-137715 U | 10/1980 |
| JP | S63-19416 A | 1/1988 |
| JP | S63-42921 U | 3/1988 |
| JP | H05-75512 U | 10/1993 |
| JP | 2005-265135 A | 9/2005 |
| JP | 2011-141020 A | 7/2011 |
| JP | 2011-247338 A | 12/2011 |
| JP | 2012-041013 A | 3/2012 |
| JP | 2013-002597 A | 1/2013 |
| JP | 2013-151969 A | 8/2013 |
| KR | 0139628 Y1 * | 4/1999 .......... F16C 11/0633 |
| KR | 100880844 B1 * | 3/2009 .......... F16C 11/0638 |
| WO | WO-2005003575 A1 * | 1/2005 .......... F16C 11/0638 |
| WO | WO-2006120787 A1 * | 11/2006 .......... F16C 11/0638 |
| WO | 2013/137003 A1 | 9/2013 |

OTHER PUBLICATIONS

Original copy of Notification for Reasons For Refusal issued in Japanese priority patent application No. JP 2016-050213, dated Feb. 6, 2017.
English translation of Notification for Reasons For Refusal issued in Japanese priority patent application No. JP 2016-050213, dated Feb. 6, 2017.
Original copy of Decision of Refusal issued in Japanese priority patent application No. JP 2016-050213, dated Sep. 4, 2017.
English translation of Decision of Refusal issued in Japanese priority patent application No. JP 2016-050213, dated Sep. 4, 2017.
Original copy of International Search Report issued in corresponding international application No. PCT/JP2017/009031, dated Jun. 6, 2017.
English translation of International Search Report issued in corresponding international application No. PCT/JP2017/009031, dated Jun. 6, 2017.
Original copy of International Preliminary Report on Patentability with a Written Opinion of the International Searching Authority issued in corresponding international application No. PCT/JP2017/009031, dated Sep. 18, 2018.
English translation of International Preliminary Report on Patentability with a Written Opinion of the International Searching Authority issued in corresponding international application No. PCT/JP2017/009031, dated Sep. 18, 2018.

* cited by examiner

BALL JOINT AND STABILIZER LINK USING SAME

CROSS-REFERENCE TO RELATED APPLICATIONS

This application is a U.S. National Stage Application under 35 U.S.C. § 371 of International Application No. PCT/JP2017/009031, filed on 7 Mar. 2017, and published on 21 Sep. 2017, as WO 2017/159458 A1, which claims the benefit of priority to Japanese Patent Application No. JP 2016-050213, filed on 14 Mar. 2016. The content of each of the above referenced patent applications is incorporated herein by reference in its entirety for any purpose whatsoever.

TECHNICAL FIELD

The present invention relates to a ball joint to be included in a stabilizer link for linking a suspension and a stabilizer in a vehicle or the like, and a stabilizer link using the same.

BACKGROUND ART

A stabilizer link in a vehicle is a component for linking a stabilizer with a strut, an arm and the like.

The strut is also referred to as a suspension, and is connected to a wheel. The strut absorbs and damps impacts, vibrations and the like which are transmitted from road surfaces to a vehicle body via the wheel.

The stabilizer increases the roll stiffness (resistance to distortion) of the vehicle body, against rolling due to displacement of the vehicle body caused by vertical movements of the wheel.

The stabilizer is linked with the strut, the arm and the like using ball joints at the two end portions of the stabilizer link. The stabilizer link includes a support bar and ball joints at the two end portions of the support bar.

Japanese Patent Application Publication No. 2013-247338 discloses an example of a structure of a ball joint.

Japanese Patent Application Publication No. 2005-265135 discloses a ball joint configuration as follows. Synthetic resin is injection-molded into a mold with a steel ball to be used as a ball part inserted in the mold to form a resin liner to be used as a ball sheet around the steel ball. Thereafter, a housing is integrally formed from an aluminum alloy or a zinc alloy around the steel ball by die casting. After that, a stud part is joined to the steel ball to be used as the ball part by resistance welding to form the ball part.

SUMMARY OF INVENTION

Technical Problem

In the case where as described in Patent Literature 2, the ball sheet is insert-molded from the resin with the ball part inserted as a core, the outer circumferential surface of the ball sheet is usually a smooth spherical surface.

In a case where a housing is insert-molded from resin with the ball part, around which the ball sheet is formed, inserted as a core, if the resin from which to mold the housing and the resin from which to mold the ball sheet are strongly joined together when the housing is being molded, the joining force between the housing and the ball sheet prevents the ball sheet from sliding over the housing when the ball part swings and slides.

On the other hand, if the two resins are weakly joined together, the ball sheet may slide over the housing when turning force of the ball part is applied to the housing and the ball sheet.

This is likely to displace the ball sheet from its appropriate position and cause friction between the ball sheet and the housing.

The present invention has been made with the above situation taken into consideration. An object of the present invention is to provide: a ball joint in which a ball sheet over which a ball part slides and a housing are strongly joined together; and a stabilizer link using the ball joint.

Solution to Problem

To solve the above problems, a ball joint according to an aspect of the present invention includes: a ball stud including a stud part to be linked to a structure body on one end portion side, and a ball part on an opposite end portion side; a housing swingably and rotationally supporting the ball part of the ball stud; and a ball sheet arranged between the housing and the ball part. The ball part is slidable over the ball sheet. The ball sheet includes an uneven part including at least one of a recessed part and a projecting part, on a surface facing the housing. The housing includes a fitting part in at least one of projecting and recessed shapes, which is fitted to the uneven part.

According to this aspect, the uneven part of the ball sheet and the fitting part of the housing are fitted to each other. This strongly joins the ball sheet and the housing together, and accordingly can inhibit the ball sheet from sliding over the housing and being displaced relative to the housing.

In another aspect, the uneven part is formed in a linear shape.

According to this aspect, the line-shaped uneven part increases the joining strength between the ball sheet and the housing, and accordingly can inhibit the ball sheet from sliding over the housing and being displaced relative to the housing.

In another aspect, the uneven part includes multiple uneven parts which are arranged with a space in between.

In another aspect, the uneven part is arranged in a support part of the ball sheet.

According to this aspect, the uneven part is located in the support part which is an area near an equatorial part of the ball sheet. Thus, the length of a rotational torque arm from an axis of the ball stud becomes long when the ball stud rotates. For this reason, the ball sheet is less likely to be displaced relative to the housing.

In another aspect, the uneven part is arranged in a bottom part of the ball sheet.

If the uneven part were formed on the ball sheet to make the thickness of the ball sheet vary to a large extent between an area where the uneven part is formed and an area where no uneven part is formed, the molding shrinkage differences between them would become larger to make the inner surface of the ball sheet wavy. This would accordingly make sliding resistance uneven between the ball sheet and the ball part. In contrast, according to this aspect, the uneven part is located in the bottom part of the ball sheet. For this reason, the support part near the equatorial part can be formed in a shape close to a true sphere, and the ball part is capable of smoothly sliding over the ball sheet.

In another aspect, the uneven part is arranged in a southern hemisphere of the ball sheet.

If the uneven part were located in a northern hemisphere (an upper hemisphere) of the ball sheet, a split mold would need to be pulled in a direction away from the axis of the ball stud after the forming of the ball sheet, and the mold would be hard to remove. In contrast to this, according to this aspect, what needs to be done is just pulling down the mold for forming the southern hemisphere (lower hemisphere) of the ball sheet. The mold is easy to remove.

Furthermore, in a case where a gate is provided to the mold near the axis of the ball stud, a portion of the ball part on one end portion side can be brought into close contact with the mold which the portion of the ball part on one end portion side touches. This makes it possible to prevent leakage of the resin for forming the ball sheet.

In another aspect, the uneven part has a shape which becomes larger toward the axis of the ball stud on the opposite end portion side.

According to this aspect, the uneven part has a shape which becomes larger toward the axis of the ball stud on the opposite end portion side. For this reason, the mold for forming the southern hemisphere can be easily removed downward along the axis after the forming of the ball sheet. Meanwhile, the shape of the uneven part becomes larger toward the axis on the opposite end portion side of the ball sheet, while the rotational torque arm of the uneven part from the axis becomes shorter toward the axis on the opposite end portion side. On the other hand, the shape of the uneven part becomes smaller as the uneven part becomes farther from the axis on the opposite end portion side, while the rotational torque arm of the uneven part from the axis becomes longer as the uneven part becomes farther from the axis on the opposite end portion side. For these reasons, the sizes of the uneven parts are in a reverse relationship to the lengths of the rotational torque arms of the uneven parts from the axis, and resistance torques to the rotational torques produced when the ball part rotates can be made closer to being equal to each other.

Another aspect is a stabilizer link for linking a suspension and a stabilizer in a vehicle. The stabilizer link includes: the ball joint according to any one of the above aspects; and a bar-shaped support bar, the ball joint being formed in an end portion of the support bar in a longitudinal-direction of the support bar. The ball joint is connected to the suspension or the stabilizer.

According to this aspect, it is possible to realize the stabilizer link which can obtain the effect of the ball joint of the aspect.

In another aspect, the uneven part is arranged in a meridian direction of the ball part.

In another aspect, the uneven part is arranged in a parallel direction of the ball part.

Advantageous Effects of Invention

The present invention can provide: the ball joint in which the ball sheet over which the ball part slides and the housing are strongly joined together; and the stabilizer link using the ball joint.

DESCRIPTION OF EMBODIMENTS

Hereinafter, embodiments of the present invention will be described with reference to the accompanying drawings.

Embodiment 1

Figure 1:
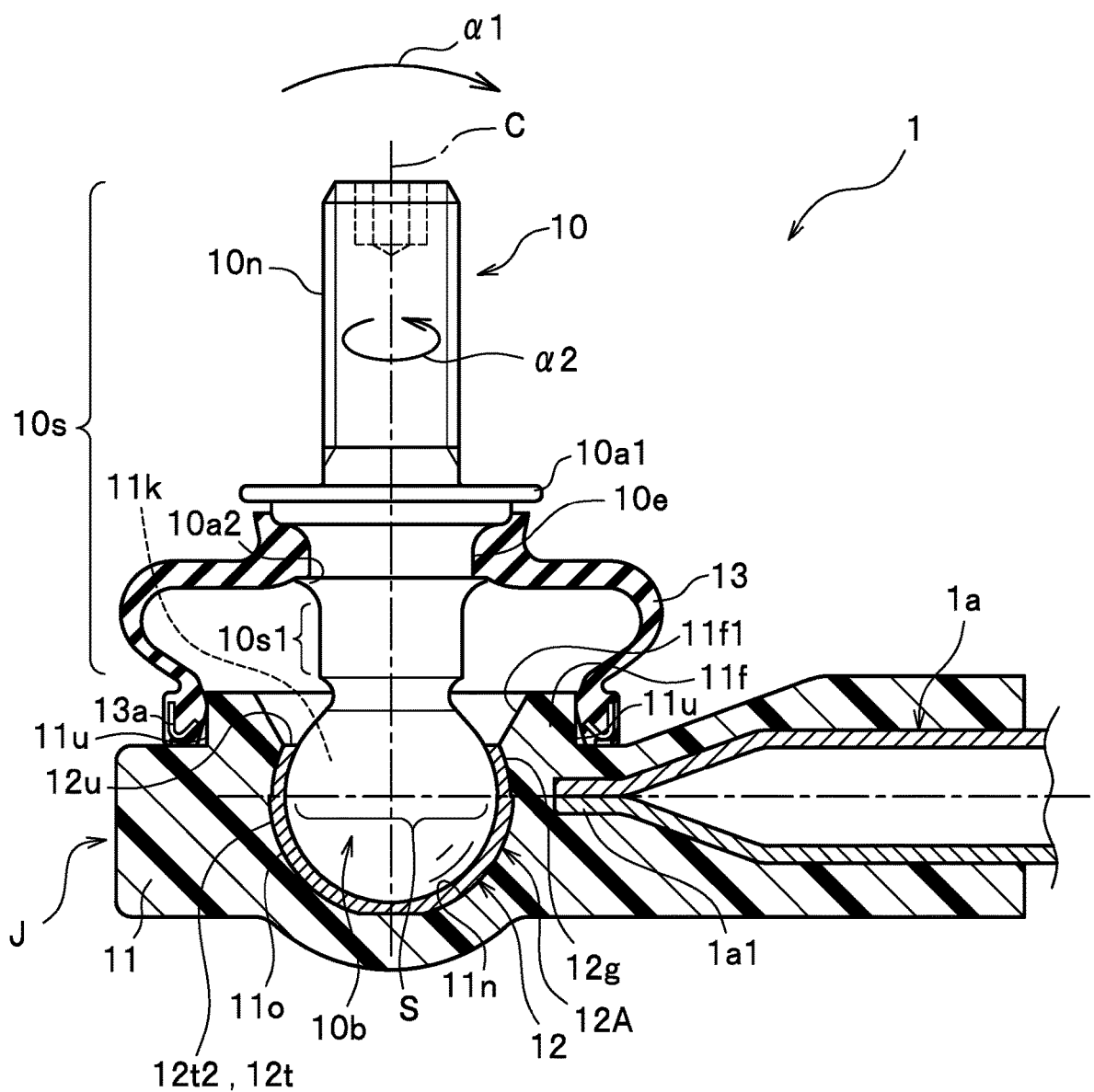
FIG. 1 is a vertical cross-sectional diagram of a ball joint of a stabilizer link according to Embodiment 1 of the present invention.

FIG. 1 is a vertical cross-sectional diagram of a ball joint of a stabilizer link according to Embodiment 1 of the present invention.

In the ball joint J according to Embodiment 1, a ball sheet 12 is insert-molded from resin around a ball part 10b in an end portion of a ball stud 10. The ball sheet 12 is a resin-made member over which the ball part slides. During the insert molding, line protrusions (uneven parts) 12t (12t1, 12t2) (see FIG. 5A), which are line-shaped projecting parts, are formed on an outer surface 12g of the ball sheet 12.

A housing 11 is insert-molded from resin around the ball part 10b which is covered with the ball sheet 12 including the line protrusions 12t, and around a distal end part 1a1 of a support bar 1a.

By this, an inner surface 11n of the resin-made housing 11 is molded in close contact with the outer surface 12g of the resin-made ball sheet 12 while anti-rotation recessed parts (fitting parts) 11o in the inner surface 11n of the housing 11 are fitted to the line protrusions 12t on the ball sheet 12.

This makes it possible to obtain the ball joint J in which the resin-made housing 11 and the resin-made ball sheet 12 are strongly joined together.

<Ball Joint J and Stabilizer Link 1 in Vehicle>

Next, descriptions will be provided for how the ball joint J according to Embodiment 1 is applied to the stabilizer link 1 used in a vehicle. Incidentally, FIG. 1 illustrates the ball joint J on one side of the stabilizer link 1.

Figure 2:
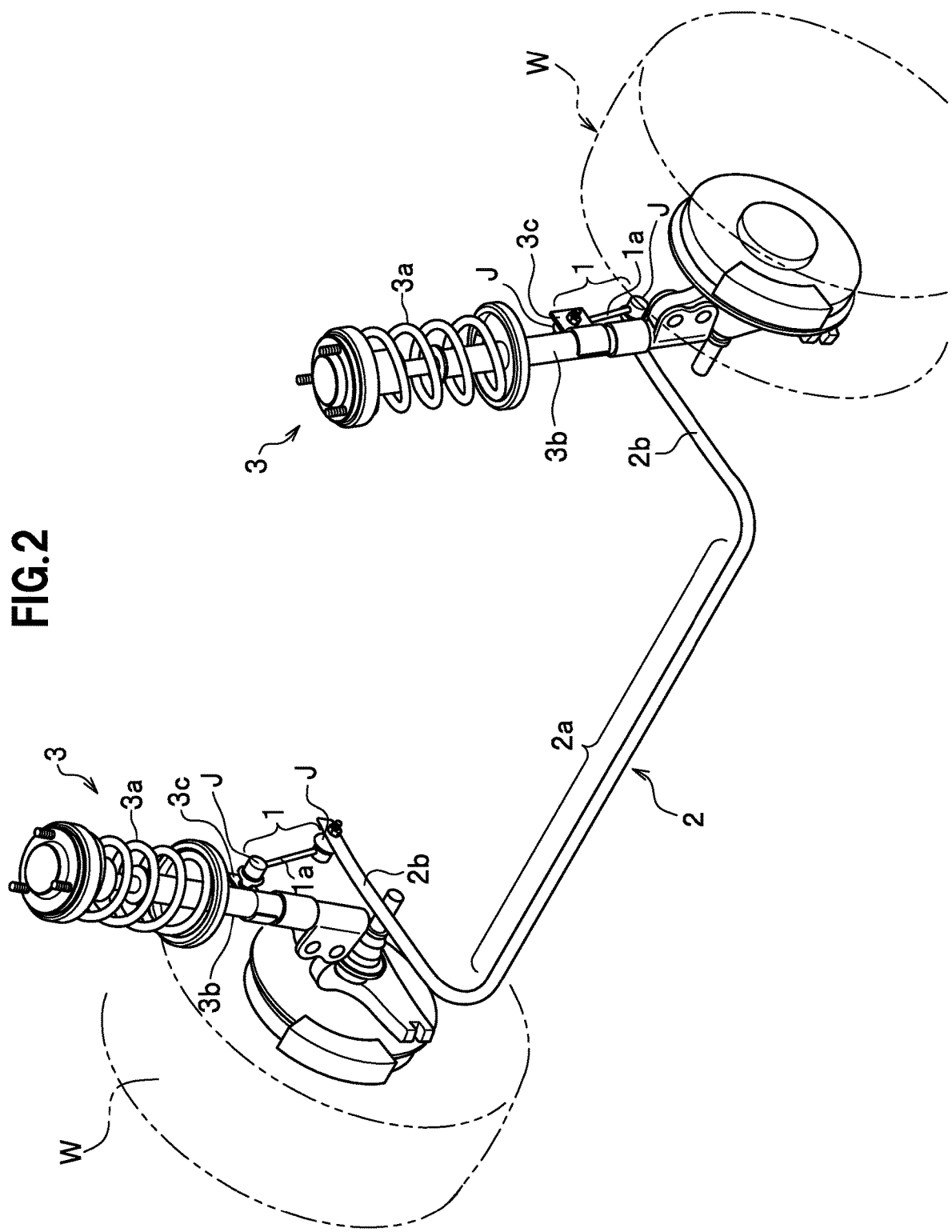
FIG. 2 is a perspective diagram illustrating wheels, a suspension and a stabilizer of a vehicle.

FIG. 2 is a perspective diagram illustrating wheels, a suspension, and the stabilizer link in the vehicle.

Each wheel W used for the vehicle (not illustrated) to run is attached to a vehicle body using a suspension 3 which includes a coil spring 3a and a shock absorber 3b.

A stabilizer 2 shaped substantially like the letter U, and made from a metal bar (a spring steel bar, a spring steel pipe or the like) is connected to the left and right suspensions 3.

The shock absorber 3b of each suspension 3 is connected to the stabilizer 2 with the assistance of the stabilizer link 1. This connection is made in the same way for both the left and right wheels W. Incidentally, the stabilizer 2 and the suspensions 3 constitute a structure boy in the present invention.

The stabilizer link 1 includes the ball joints J at its two ends. A distal end portion of an arm part 2b of the stabilizer 2 is connected to one ball joint J, while the shock absorber 3b is connected to the other ball joint J.

The stabilizer link 1 includes the bar-shaped support bar 1a and the ball joints J. The ball joints J are arranged at the two ends of the support bar 1a, respectively.

In each ball joint J, the ball-shaped ball part 10b formed in the other end portion of the ball stud 10 is housed in, and swingably (indicated with an arrow α1 in FIG. 1) and rotationally (indicated with an arrow α2 in FIG. 1) supported by, the housing 11. The ball stud 10 in the ball joint J swings and turns relative to the support bar 1a of the stabilizer link 1 in response to strokes which the suspension 3 makes while the vehicle is running.

<Ball Stud 10>

The ball stud 10 illustrated in FIG. 1 includes a bar-shaped stud part 10s and the ball-shaped ball part 10b.

The ball part 10b is formed in the other end portion of the ball stud 10, while the stud part 10s is formed in the one end portion of the ball stud 10.

A flange part 10a1 and a small flange part 10a2, both extending in a circular shape, are formed in the stud part 10s of the ball stud 10. The flange part 10a1 and the small flange part 10a2 are arranged with a space in between. A male thread 10n is formed on a portion of the stud part 10s of the ball stud 10 which is on the one end portion side of the flange part 10a1.

A dust cover 13 is arranged between an upper end portion of the housing 11 and the flange part 10a1. The dust cover 13 is a member for blocking rain water, dust and the like from entering the ball joint J.

An upper end circular portion of the dust cover 13 is fitted into a circular recessed part 10e between the flange part 10a1 and the small flange part 10a2. Meanwhile, a portion near an iron link 13a embedded in a lower end circular portion of the dust cover 13 is fitted into and fixed to a recessed part 11u forming an outer circumferential surface of a projection-shaped flange part 11f in an upper portion of the housing 11.

The ball stud 10 in the ball joint J on one side of the support bar 1a is fastened and fixed to a bracket 3c of the shock absorber 3b. In addition, the ball stud 10 in the ball joint J on the other side of the support bar 1a is fastened and fixed to the distal end portion of the arm part 2b of the stabilizer 2.

As discussed above, the stabilizer 2 and the suspensions 3 are linked together with the assistance of the stabilizer links 1.

Each stabilizer link 1 is swingably (indicated with the arrow α1 in FIG. 1) and rotationally (indicated with the arrow α2 in FIG. 1) supported by the ball joints J in the two respective end portions of the stabilizer link 1. The stabilizer link 1, therefore, is movable relative to the suspension 3 and the stabilizer 2. In other words, the stabilizer link 1 is movable in response to movements of the suspension 3 and the stabilizer 2.

<Ball Joint J>

Next, detailed descriptions will be provided for a configuration of the ball joint J.

As illustrated in FIG. 1, in each ball joint J, the ball part 10b in the other end portion of the ball stud 10 is covered with the ball sheet 12. Furthermore, the ball part 10b covered with the ball sheet 12, together with the distal end part 1a1 of the support bar 1a, is covered with and fixed to the resin-made housing 11. An opening 11k through which the stud part 10s penetrates is formed in the housing 11.

Meanwhile, since the ball part 10b in the other end portion of the ball stud 10 is made from metal such as steel, the ball part 10b is slidable over the resin-made ball sheet 12 when external force or the like is applied to the ball part 10b. To this end, the ball part 10b is supported swingably (indicated with the arrow α1 in FIG. 1) and rotationally (indicated with the arrow α2 in FIG. 1) relative to the ball sheet 12 integrally formed in the resin-made housing 11.

A column-shaped connection part 10s1 is formed in a portion of the stud part 10s which is on the other end portion side of the small flange part 10a2 formed in the circular shape.

The housing 11 is made from, for example, PA66-GF30 (PA66 with glass fibers contained therein at a 30% weight ratio). Incidentally, any material may be used for the housing 11 as long as the material satisfies a strength requirement, weathering resistance and the like.

Examples of a material to be used for the housing 11 include: engineering plastics such as polyetheretherketone (PEEK), polyamide 66 (PA66), polyphenylene sulfide resin (PPS) and polyoxymethylene (POM); super-engineering plastics; fiber reinforced plastics (FRPs); glass reinforced plastics (GRPs); carbon fiber reinforced plastics (CFRPs).

The projection-shaped flange part 11f in a projecting shape is formed circularly in the upper portion of the housing 11. The projection-shaped flange part 11f includes a tapered part 11f1 which becomes wider toward the outside of the housing 11 from an upper end 12u of the ball sheet 12, and which is formed in the shape of a conical surface.

An angle of inclination of the tapered part 11f1 to an axis C of the ball stud 10 is determined by a swing angle of the ball stud 10, the diameter of the connection part 10s1, and the like. The tapered part 11f1 determines a maximum swing angle of the ball stud 10.

The ball sheet 12 is formed including a spherical inner surface which covers the globular ball part 10b of the ball stud 10. In an area of the ball sheet 12 covering the ball part 10b which is on the other end portion side of the ball stud 10 from an equatorial part S of the ball sheet 12, the line protrusions (uneven parts) 12t (see FIG. 5A) are formed projecting from the outer surface 12g of the ball sheet 12. The equatorial part S is a portion of the ball sheet 12 where the diameter of the ball sheet 12 around the axis C of the ball stud 10 is largest.

The line protrusions 12t each have a line-like projecting shape (see FIGS. 5C and 5D), and constitute anti-rotation projecting portions for the ball sheet 12 and the housing 11.

Figure 3:
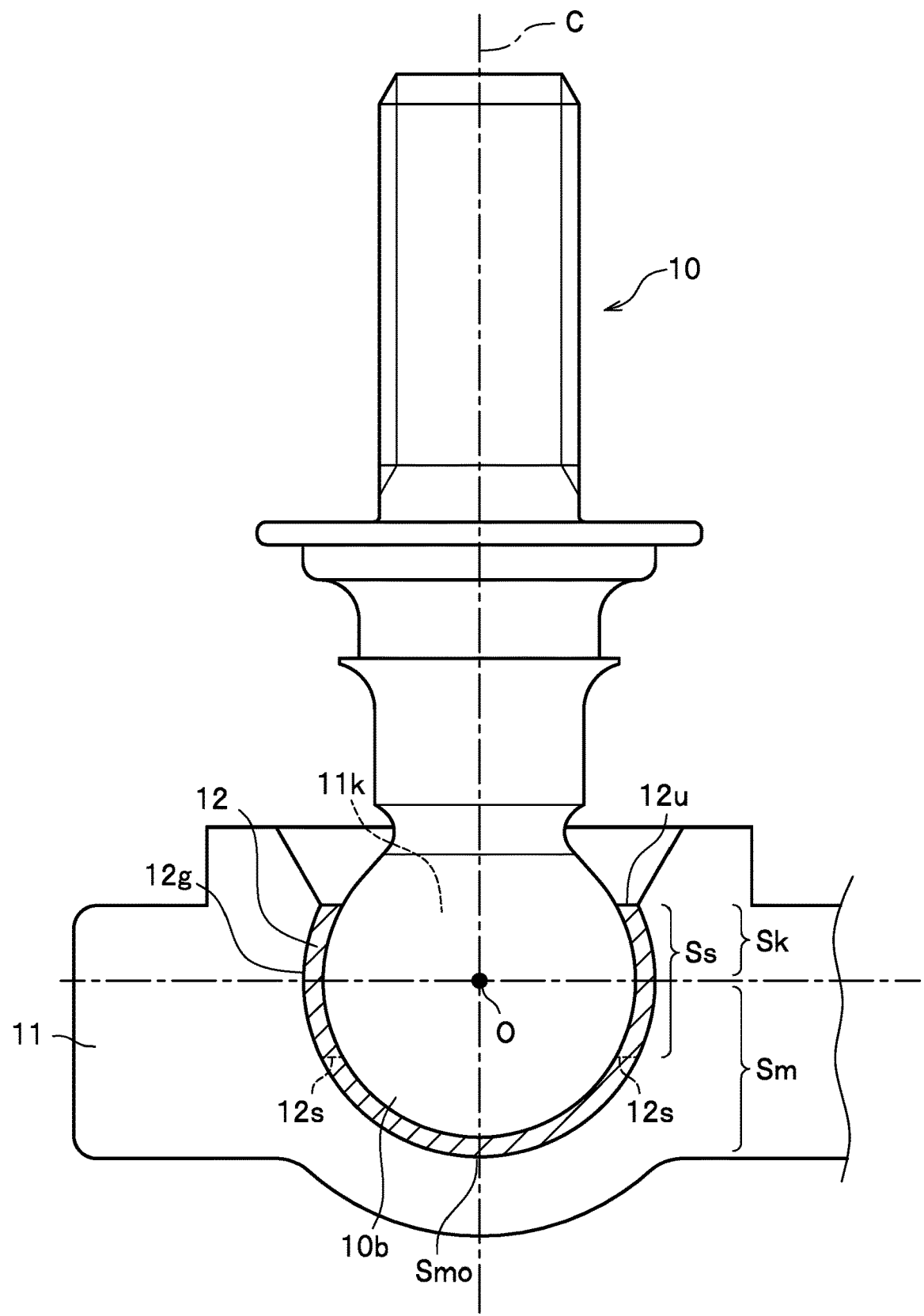
FIG. 3 is a cross-sectional diagram for showing names of parts of the ball joint.

FIG. 3 is a cross-sectional diagram for showing names of parts of the ball joint. The parts of the ball sheet 12 formed around the ball part 10*b* of the ball stud 10 according to Embodiments 1 to 3 are denoted with the following names.

The shock absorber 3*b* of the suspension 3 or the arm part 2*b* of the stabilizer 2 is fastened and fixed to one end portion of the ball stud 10, while the ball part 10*b* is formed in the other end portion of the ball stud 10.

A hemisphere of the ball sheet 12 which is on one end portion side of the ball stud 10 from the equatorial part S is called a northern hemisphere (upper hemisphere) Sk, while a hemisphere of the ball sheet 12 which is on the other end portion side of the ball stud 10 from the equatorial part S is called a southern hemisphere (lower hemisphere) Sm. A point where the axis C and the outer surface 12*g* of the circumferential surface of the southern hemisphere Sm of the ball sheet 12 intersect each other is called a south pole Sm0.

In the ball sheet 12 illustrated in FIG. 3, its portion between the upper end 12*u* of the ball sheet 12 and a position 12*s* on the ball sheet 12 which is symmetrical to the upper end 12*u* with respect to the equatorial part S is called a support part Ss. The support part Ss of the ball sheet 12 is a part which swingably supports the ball part 10*b*, and is required to be smooth.

Incidentally, a latitudinal direction (parallel direction) of the ball sheet 12 means a circumferential direction along the outer surface 12*g* of the ball sheet 12 which is vertical to the axis C of the ball stud 10. A longitudinal direction (meridian direction) of the ball sheet 12 means a circumferential direction along the axis C.

The terms, the equatorial part S, the northern hemisphere Sk, the southern hemisphere Sm, and the south pole Sm0 are used concerning the ball sheet 12.

The anti-rotation recessed parts 11*o* are formed in the inner surface 11*n* of the housing 11 illustrated in FIG. 1 such that the anti-rotation recess parts 11*o* are in close contact with the line protrusions 12*t* on the outer surface 12*g* of the ball sheet 12 in the southern hemisphere Sm. Since in the southern hemisphere Sm, the line protrusions 12*t* on the outer surface 12*g* of the ball sheet 12 are fitted into the recessed parts 11*o* in the inner surface 11*n* of the housing 11, the ball sheet 12 and the housing 11 are strongly jointed and fixed to each other.

Polyoxymethylene (POM) is used as the material of the ball sheet 12. Instead of POM, other materials may be used for the ball sheet 12 as long as the materials are similarly thermoplastic resin, and satisfy an abrasion requirement and the like. As discussed above, the inner surface of the ball sheet 12 is required to have predetermined abrasion durability since the ball part 10*b* of the ball stud 10 slides over the inner surface of the ball sheet 12 while swinging and rotating.

The ball sheet 12 is made from, for example, an engineering plastic such as polyetheretherketone (PEEK), polyimide 66 (PA 66), polyimide 6 (PA6) and polyphenylene sulfide resin (PPS), or a super-engineering plastic. Since the ball sheet 12 is insert-molded, a thermoplastic resin is preferably used.

The thickness of the ball sheet 12 is set at 0.4 mm or greater but 2.0 mm or less. If the thickness of the ball sheet 12 is less than 0.4 mm, the fluidity of the resin is poor while the ball sheet 12 is being formed. On the other hand, if the thickness of the ball sheet 12 is greater than 2.0 mm, an amount of movement of the ball stud 10 is larger than otherwise since the material of the ball sheet 12 is an elastic body. This increases the elastic lift.

With the above taken into consideration, it is desirable that the thickness of the ball sheet 12 be 0.4 mm or greater but 2.0 mm or less.

The support bar 1*a* is made from, for example, a steel pipe. The distal end part 1*a*1 of the support bar 1*a* is plastically deformed in the shape of a flat plate by being pressed in a direction in which the ball stud 10 extends.

The ball stud 10 may be obtained by joining the ball part 10*b* to the stud part 10*s* by welding, or by integrally forming the stud part 10*s* and the ball part 10*b* together.

Embodiment 1 has been and will be described using the case where the ball stud 10 is obtained by integrally forming the stud part 10*s* and the ball part 10*b* together.

Figure 4:
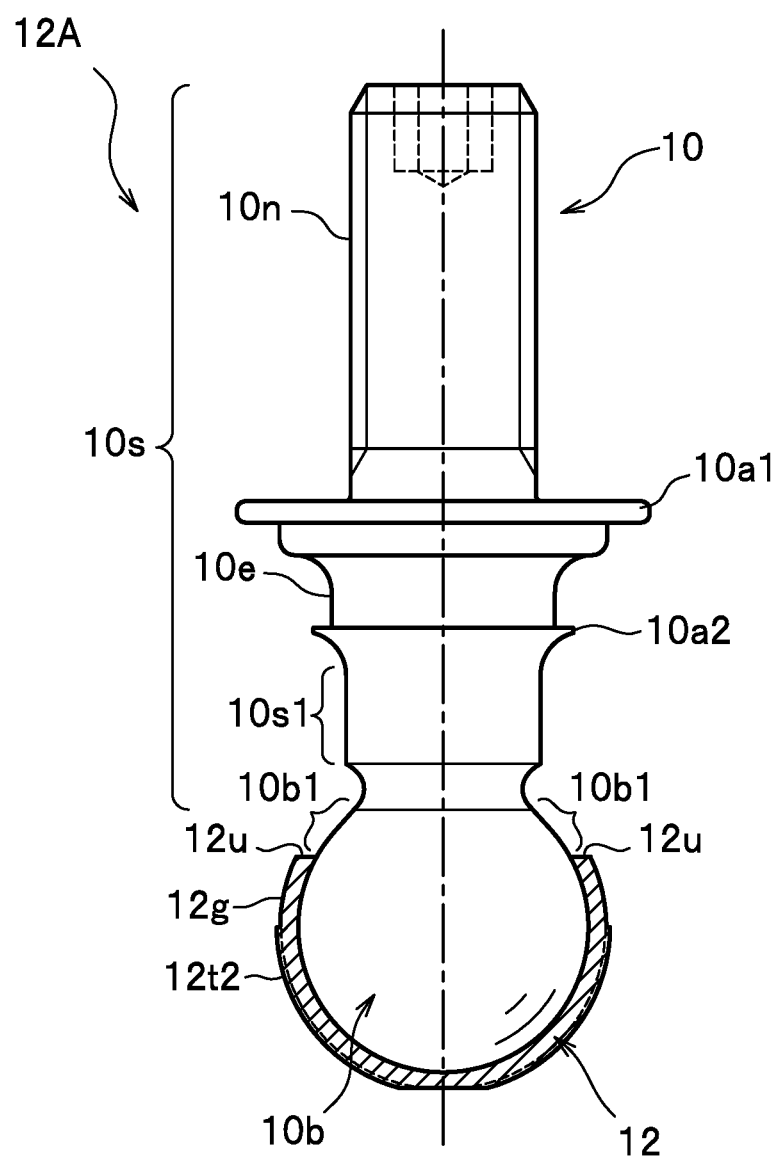
FIG. 4 is an external appearance diagram illustrating how a ball sheet is attached to a ball part of a ball stud, and including a cross section of the ball sheet.
Figure 5A:
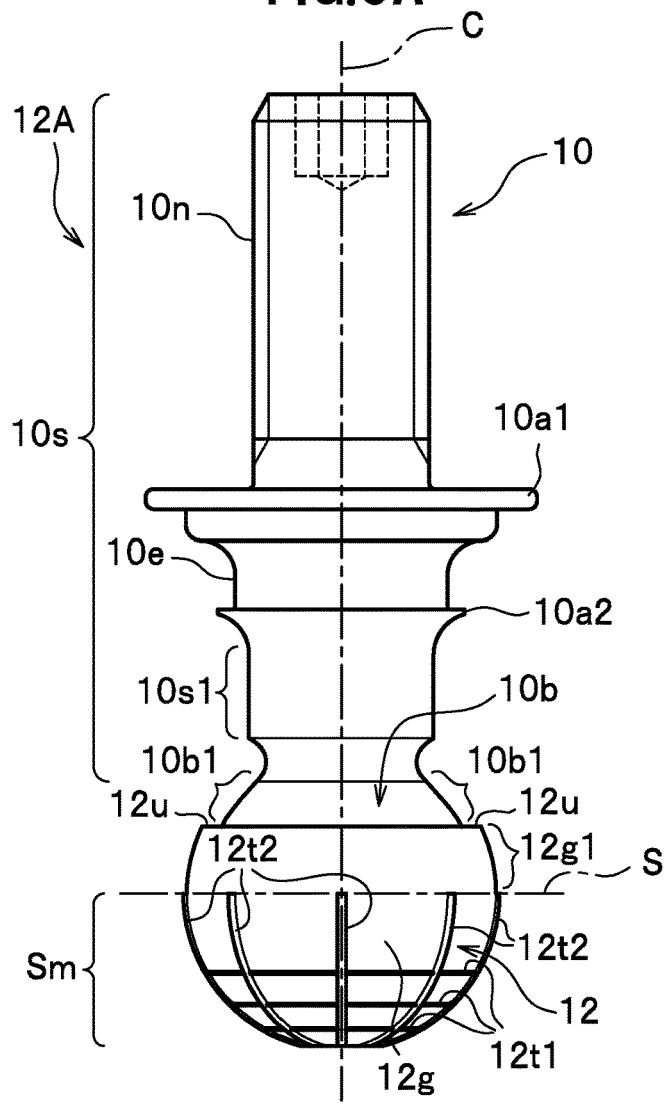
FIG. 5A is a perspective diagram illustrating the ball stud with the ball sheet formed abound the ball part of the ball stud.
Figure 5B:
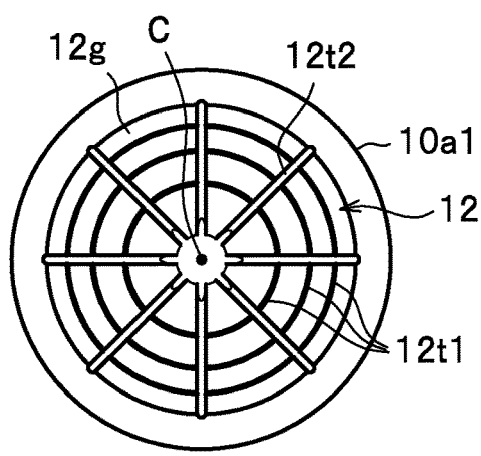
FIG. 5B is a bottom diagram illustrating the ball stud with the ball sheet formed abound the ball part of the ball stud.
Figure 5C:
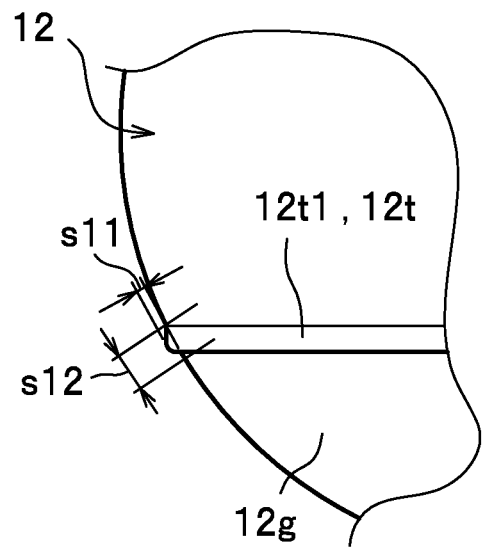
FIG. 5C is an external appearance diagram illustrating a line protrusion in FIG. 5A which extends in a latitudinal direction.

FIG. 4 is an external appearance diagram illustrating how the ball sheet is attached to the ball part of the ball stud, and including the cross section of the ball sheet. FIGS. 5A and 5B are respectively a perspective diagram and a bottom diagram both illustrating the ball stud with the ball sheet formed abound the ball part of the ball stud. FIG. 5C is an external appearance diagram illustrating a line protrusion which extends in the latitudinal direction, while FIG. 5D is an external appearance diagram illustrating a line protrusion which extends in the longitudinal direction.

After the production of the ball stud 10, the ball sheet 12 is insert-molded from, for example POM, with the ball part 10*b* of the ball stud 10 inserted as the core. Thereby, a ball sheet assembly 12A (see FIG. 4) is produced.

As illustrated in FIGS. 5A and 5B, on the outer surface 12*g* of the ball sheet 12, the line protrusions (uneven parts) 12*t*1 extending in the latitudinal direction are formed in an area in the southern hemisphere Sm which lies at latitude approximately 30° and beyond from the equatorial part S. In addition, the line protrusions (uneven parts) 12*t*2 extending in the longitudinal direction are formed on the outer surface 12*g* of the southern hemisphere Sm of the ball sheet 12.

Figure 5D:
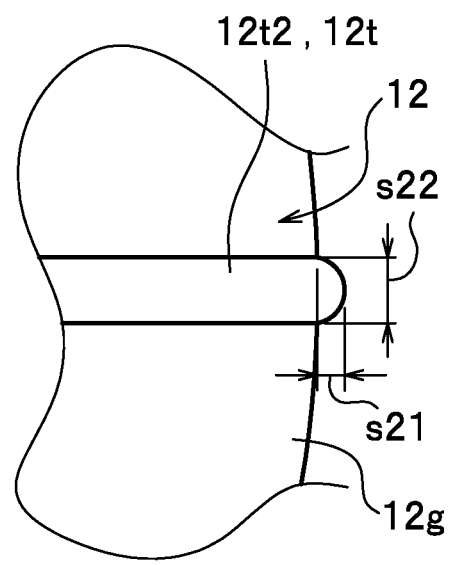
FIG. 5D is an external appearance diagram illustrating a line protrusion in FIG. 5B which extends in a longitudinal direction.

As illustrated in FIGS. 5C and 5D, protrusion heights s11, s21 of the respective line protrusions 12*t*1, 12*t*2 are 0.5 mm or less for the purpose of, for example, inhibiting unevenness of interference of the ball part 10*b* due to molding shrinkage.

Incidentally, the protrusion heights s11, s21 do not necessarily have to be 0.5 mm or less, depending on the diameter of the ball part 10*b*, the thickness of the ball sheet 12, and the like.

Protrusion widths S12, s22 of the of the respective line protrusions 12*t*1, 12*t*2 are 0.5 mm or less for the purpose of, for example, inhibiting unevenness of interference of the ball part 10*b* due to molding shrinkage.

Incidentally, the protrusion heights s12, s22 do not necessarily have to be 0.5 mm or less, depending on the diameter of the ball part 10*b*, the thickness of the ball sheet 12, and the like.

Each line protrusion 12*t*1 extending in the latitudinal direction in the southern hemisphere Sm does not have a horizontal undercut from the outer surface 12*g* of the ball sheet 12 formed around the ball part 10*b* with taken into consideration the removability of the line protrusion 12*t*1 from a lower mold Ka (see FIG. 6B), a lower forming mold, which is pulled downward along the axis C shown in FIG. 5A.

The cross-sectional shapes of the line protrusions 12*t*1, 12*t*2 are not specifically limited and may be arbitrarily selected as long as: the line protrusions 12*t*1, 12*t*2 can be molded into a form such as a semicircular form or the like having a curvature, or an angular form; and the protrusion heights s11, s21 (see FIGS. 5C and 5D) of the line protrusions 12*t*1, 12*t*2 are within the specific value.

It is desirable that the line protrusions 12t1 extending in the latitudinal direction in the southern hemisphere Sm be formed in an area in the southern hemisphere Sm which lies at latitude 45° and beyond from the equatorial part S (as a reference whose latitude is 0°), since the lower forming mold is pulled downward. A downward-facing portion is larger in the area in the southern hemisphere Sm which lies at latitude 45° and beyond than in the remaining area in the southern hemisphere Sm, where latitude 45° from the equatorial part S is regarded as the boundary between the upper and lower halves of the southern hemisphere Sm.

As illustrated in FIG. 5B, eight line protrusions 12t2 extending in the longitudinal direction are formed in the southern hemisphere Sm (see FIG. 3) between the bottom of the ball sheet 12 and the vicinity of the equatorial part S of the ball sheet 12 at intervals of approximately 45° around the axis C.

Figure 6A:
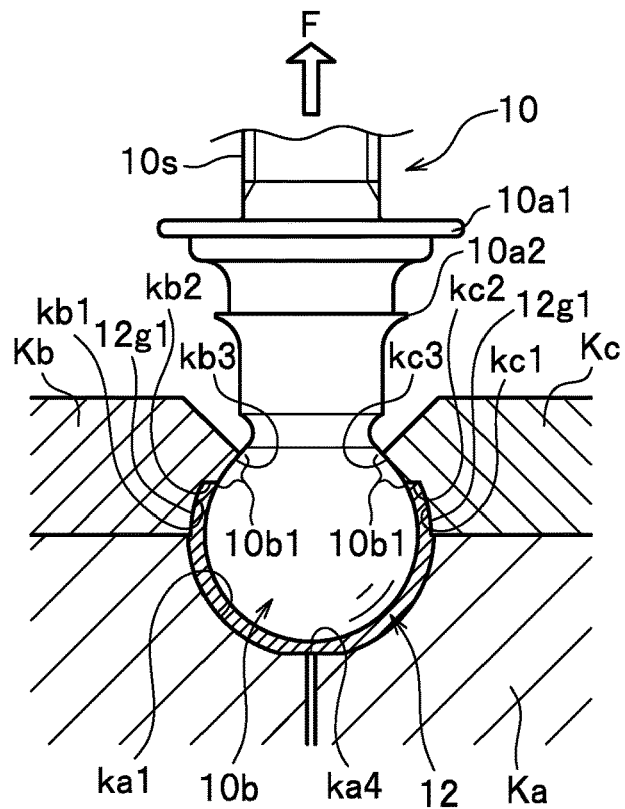
FIG. 6A is a partial cross-sectional side diagram illustrating the ball sheet which is being insert-molded with the ball part of the ball stud inserted as a core.
Figure 6B:
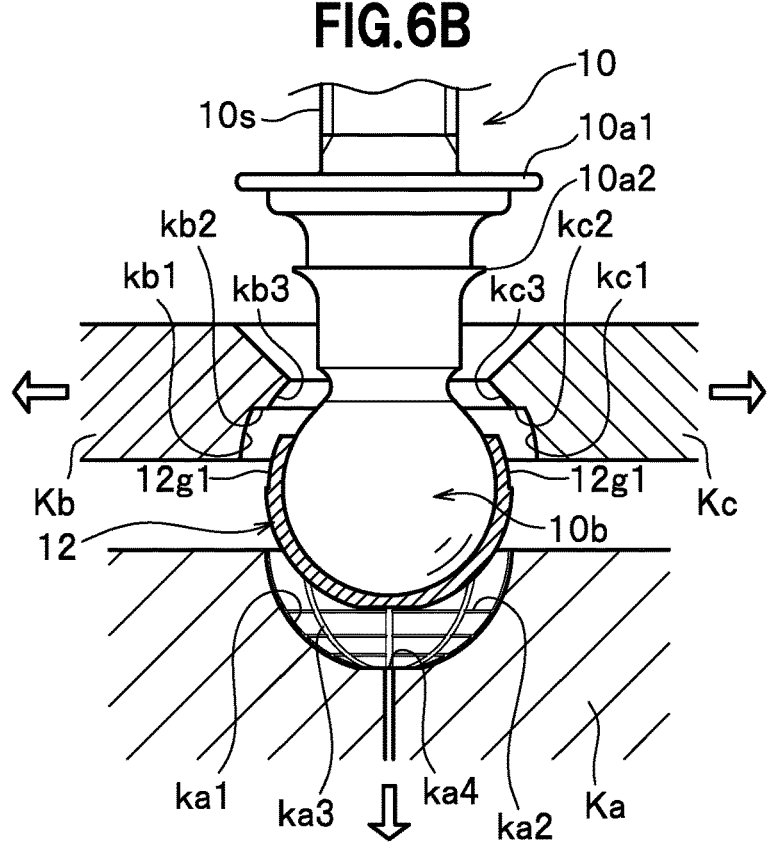
FIG. 6B is a partial cross-sectional side diagram illustrating how molds are removed from the ball stud after the ball sheet 12 are insert-molded.

FIG. 6A is a partial cross-sectional side diagram illustrating the ball sheet which is being insert-molded with the ball part of the ball stud inserted as the core. FIG. 6B is a partial cross-sectional side diagram illustrating how molds are removed after the ball sheet 12 is insert-molded.

The insert molding of the ball sheet 12 with the ball part 10b of the ball stud 10 inserted as the core is achieved by using the lower mold Ka, an upper first mold Kb as one half of a split mold, and an upper second mold Kc as the other half of the split mold, as illustrated in FIG. 6A.

The ball part 10b is sealed with first and second upper hemispherical surfaces kb3, kc3 of the respective upper first and second molds Kb, Kc as the two halves of the split mold, in order to prevent the resin from leaking to an outer spherical surface of the ball part 10b which exists on a side close to the stud part 10s.

The upper first and second molds Kb, Kc as the two halves of the split mold are molds for molding the northern hemisphere Sk (see FIG. 3) of the ball sheet 12.

The lower mold Ka is a mold for molding the southern hemisphere Sm (see FIG. 3) of the ball sheet 12.

An inner surface ka1 of the lower mold Ka is formed in the shape of a recessed hemispherical surface in order to mold the southern hemisphere Sm of the outer surface 12g of the ball sheet 12. Furthermore, in the inner surface ka1 of the lower mold Ka, multiple recessed parts ka2 (see FIG. 6B) each in a recessed shape extending in the latitudinal direction are formed in an area in the southern hemisphere Sm which lies at latitude approximately 30° and beyond from the equatorial part S of the ball sheet 12. Furthermore, multiple recessed parts ka3 each in a recessed shape extending in the longitudinal direction are formed in the inner surface ka1 of the lower mold Ka. These recessed parts ka3 form the line protrusions 12t2 on the southern hemisphere Sm of the ball sheet 12.

The recessed parts ka2 form the line protrusions 12t1 extending in the latitudinal direction on the ball sheet 12, while the recessed parts ka3 form the line protrusions 12t2 extending in the longitudinal direction on the ball sheet 12.

The lower mold Ka includes a gate ka4 serving as an injection hole through which to inject the resin for forming the ball sheet 12, and formed upward from a position (the south pole Sm0 in FIG. 3) through which the axis C of the ball stud 10 substantially passes.

The upper first and second mold Kb, Kc as the two halves of the split mold are molds for forming the northern hemisphere Sk of the ball sheet 12, and have a shape corresponding to a recessed, substantially hemispherical shape of the ball sheet 12. The upper first mold Kb as one half of the split mold includes a first hemispherical surface kb1 and a first semicircular surface kb2 formed therein to form an upper outer surface 12g1 and the semicircular upper end 12u (see FIG. 5A) of the spherical surface of the northern hemisphere Sk of the ball sheet 12. Furthermore, the upper first mold Kb includes the first upper hemispherical surface kb3, a recessed spherical surface, which has a shape in close contact with the ball part 10b near the stud part 10s.

The upper second mold Kc as the other half of the split mold includes a second hemispherical surface kc1 and a second semicircular surface kc2 formed thereinto form the upper outer surface 12g1 and the semicircular upper end 12u of the spherical surface of the northern hemisphere Sk of the ball sheet 12. Furthermore, the upper second mold Kc includes the second upper hemispherical surface kc3, a recessed spherical surface, which has a shape in close contact with the ball part 10b near the stud part 10s.

As illustrated in FIG. 6A, the ball part 10b of the ball stud 10 is covered with the lower mold Ka and the upper first and second molds Kb, Kc as the two halves of the split mold with the ball part 10b inserted as the core among them.

Thereafter, the resin for forming the ball sheet 12 is injected through the gate ka4 in the lower mold Ka. During the injection, since the resin is introduced through the gate ka4 in the lower mold Ka under the ball part 10b, the ball stud 10 receives an upward force (a force F in FIG. 6A) from injection pressure of the resin, and a spherical stud vicinity part 10b1 of the ball part 10b near the stud part 10s comes into close contact with the first upper hemispherical surface Kb3 of the upper first mold Kb and the second upper hemispherical surface Kc3 of the upper second mold Kc. This makes it possible to prevent the resin for molding the ball sheet 12 from leaking to the stud vicinity part 10b1.

After the molding of the ball sheet 12, as illustrated in FIG. 6B, the lower mold Ka is moved downward and thereby removed from the ball sheet 12 formed around the ball part 10b. Furthermore, the upper first and second molds Kb, Kc are moved sideward to the outside and thereby removed from the formed ball sheet 12. Thereby, the ball sheet assembly 12A illustrated in FIG. 5A is produced.

Because of the use of the lower mold Ka, while the ball sheet 12 is being insert-molded with the ball part 10b inserted as the core, the resin is filled into the multiple recessed parts ka2 extending in the latitudinal direction and the multiple recessed parts ka3 extending in the longitudinal direction in the lower mold Ka. Thereby, the line protrusions 12t1 extending in the latitudinal direction and the line protrusions 12t2 extending in the longitudinal direction are formed on the outer surface 12g of the ball sheet 12.

Figure 7:
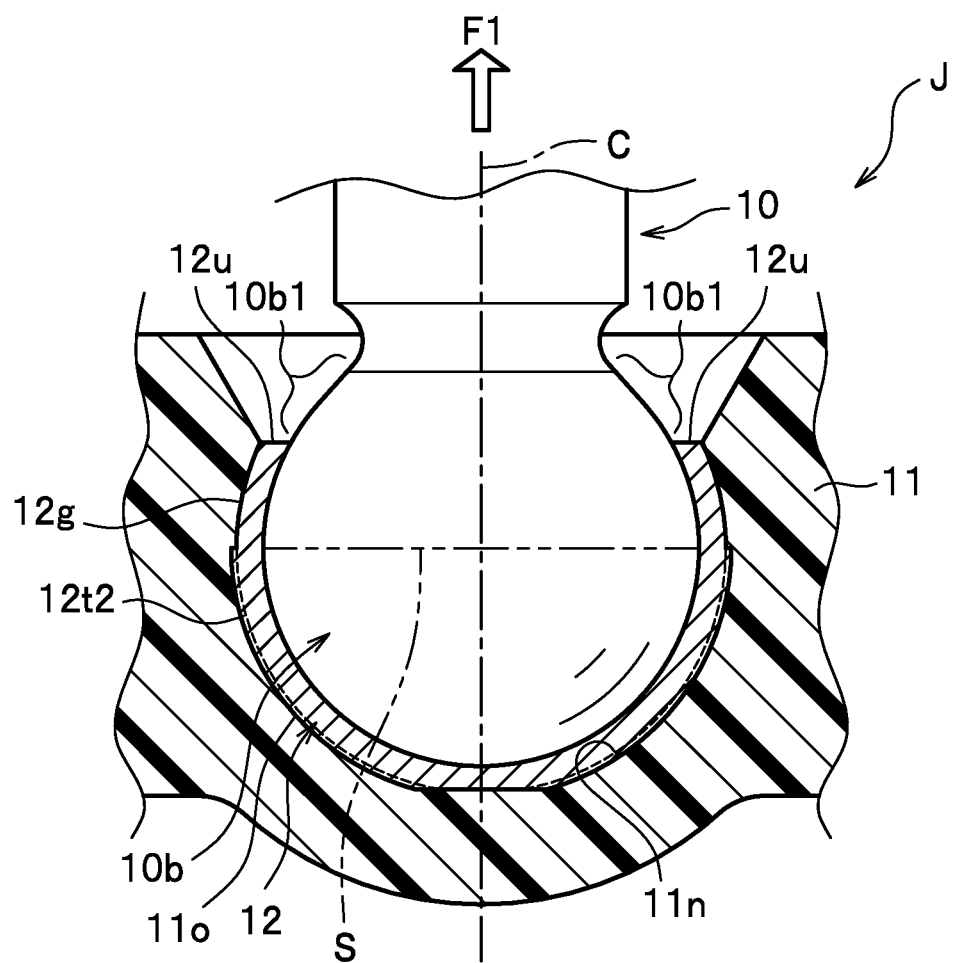
FIG. 7 is a partial cross-sectional diagram illustrating how the ball sheet and the housing are joined together.

After that, the housing 11 is insert-molded with the ball part 10b, around which the ball sheet 12 is formed, inserted as the core. Thereby, the ball joint J as illustrated in FIG. 7 is formed. FIG. 7 is a partial cross-sectional diagram illustrating how the ball sheet and the housing are joined together.

The housing 11 is molded in close contact with: the outer surface 12g of the ball sheet 12; and the line protrusions 12t1 extending in the latitudinal direction and the line protrusions 12t2 extending in the longitudinal direction which are formed on the southern hemisphere Sm of the outer surface 12g. During the molding of the housing 11, the resin of the housing 11 surrounds the multiple line protrusions 12t1, 12t2 on the ball sheet 12 to form the anti-rotation recessed parts 11o in the inner surface 11n of the housing 11.

Thereby, in the southern hemisphere Sm of the ball sheet 12, the line protrusions 12t1 extending in the latitudinal direction and the line protrusions 12t2 extending in the longitudinal direction are fitted into the anti-rotation recessed parts 11*o* in the housing 11.

The above-discussed configuration reinforces the joining or bonding strength between the ball sheet 12 and the housing 11 since: as illustrated in FIG. 5A, the projecting line protrusions 12*t*1, 12*t*2 extending in the latitudinal and longitudinal directions are formed on the southern hemisphere Sm; and the line protrusions 12*t*1, 12*t*2 are fitted into the anti-rotation recessed parts 11*o* (see FIG. 1) of the housing 11.

The configuration, therefore, is capable of inhibiting the ball sheet 12 from sliding over the housing 11 and being displaced relative to the housing 11 when swing torque (indicated with the arrow α1 in FIG. 1) and rotational torque (indicated with the arrow α2 in FIG. 1) are applied to the ball stud 10, as well as when external force F1 (indicated with an outlined arrow in FIG. 7) to cause the elastic lift is applied to the ball stud 10.

Furthermore, the configuration makes it easy to remove the molds after the forming of the ball sheet 12 since the configuration allows the lower mold Ka for forming the southern hemisphere of the ball sheet 12 to be just pulled downward (see FIG. 6B).

Moreover, the configuration brings the spherical stud vicinity part 10*b*1 of the ball part 10*b* into close contact with the first upper hemispherical surface Kb3 of the upper first mold Kb and the second upper hemispherical surface Kc3 of the upper second mold Kc since the configuration introduces the resin for forming the ball sheet 12 through the gate Ka4 in the lower mold Ka under the ball part 10*b*, and thereby makes the ball stud 10 receive the upward force (the force F illustrated in FIG. 6A) from the injection pressure of the resin. The configuration, therefore, is capable of molding the ball sheet 12 while preventing the resin from leaking to the ball part 10*b* above the upper end 12*u* of the ball sheet 12.

Besides, the configuration makes it easy to produce the lower mold Ka since the configuration enables the multiple recessed parts ka2 extending in the latitudinal direction and the multiple recessed parts ka3 extending in the longitudinal direction in the lower mold Ka to be formed by machining the corresponding grooves in the lower mold Ka.

<Modification>

Figure 5E:
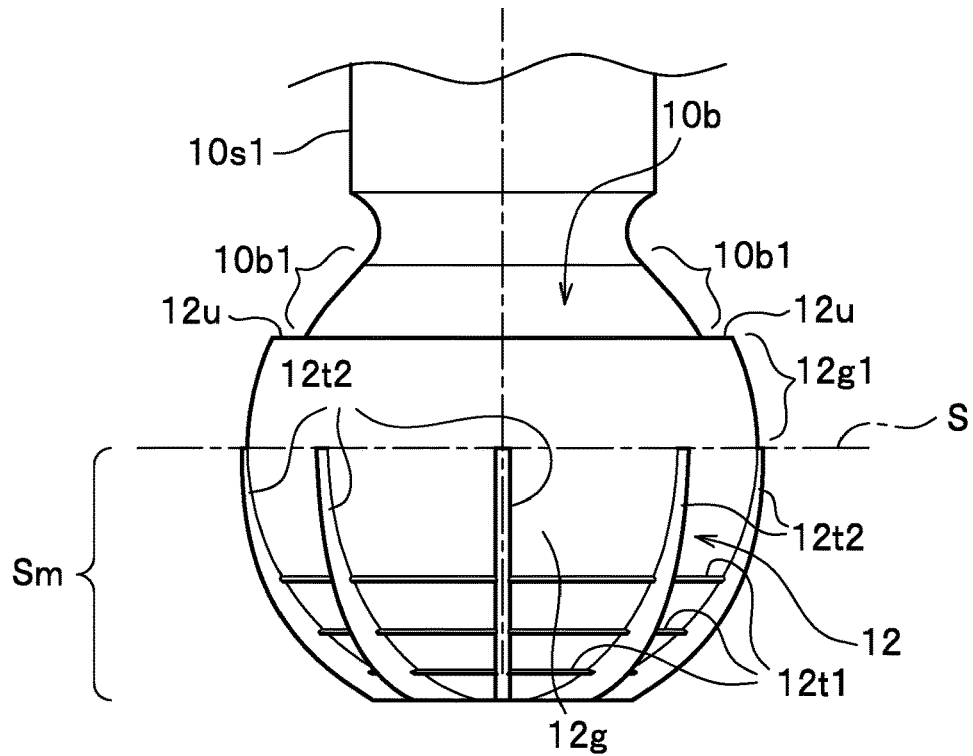
FIG. 5E is an elevation diagram of a ball part of a ball stud according to a modification.
Figure 5F:
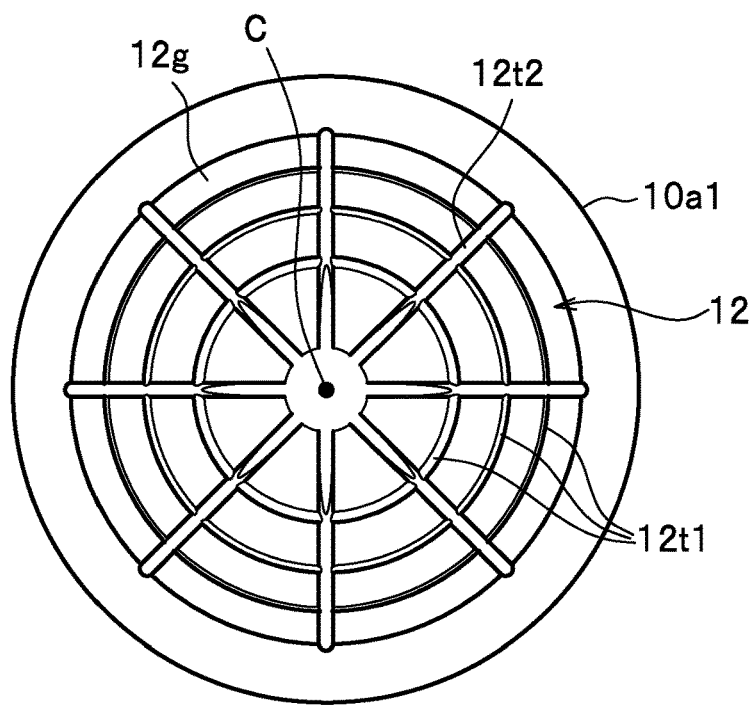
FIG. 5F is a bottom diagram of the ball part of the ball stud according to the modification.

As a modification, at least either the line protrusions 12*t*1 extending in the latitudinal direction or the line protrusions 12*t*2 extending in the longitudinal direction on the ball sheet 12 may each have a shape which becomes larger toward the south pole Sm0, as illustrated in FIGS. 5E and 5F.

This configuration makes it possible to smoothly remove the lower mold Ka downward after the molding of the ball sheet 12, and to reinforce the joining strength between the ball sheet 12 and the housing 11.

In addition, the configuration makes the heights of the line protrusions 12*t*1, 12*t*2 lower in the support part Ss, and thus decreases or eliminates the molding shrinkage. The configuration, therefore, is capable of making the thickness of the support part Ss of the ball sheet 12 even.

For this reason, the support part Ss near the equatorial part S has a shape close to a true sphere, and the ball part 10*b* smoothly slides over the ball sheet 12. In other words, the shapes of the line protrusions 12*t*1, 12*t*2 become smaller as the line protrusions 12*t*1, 12*t*2 become farther from the axis C on the other end portion side. The rotational torque arms of the line protrusions 12*t*1, 12*t*2 from the axis C become longer as the line protrusions 12*t*1, 12*t*2 become farther from the axis C on the other end portion side. For these reasons, the sizes of the line protrusions 12*t*1, 12*t*2 are in a reverse relationship to the lengths of the rotational torque arms of the line protrusions 12*t*1, 12*t*2 from the axis C, and the resistance torques to the rotational torques produced when the ball part 10*b* rotates can be made closer to being equal to each other.

Embodiment 2

Figure 8A:
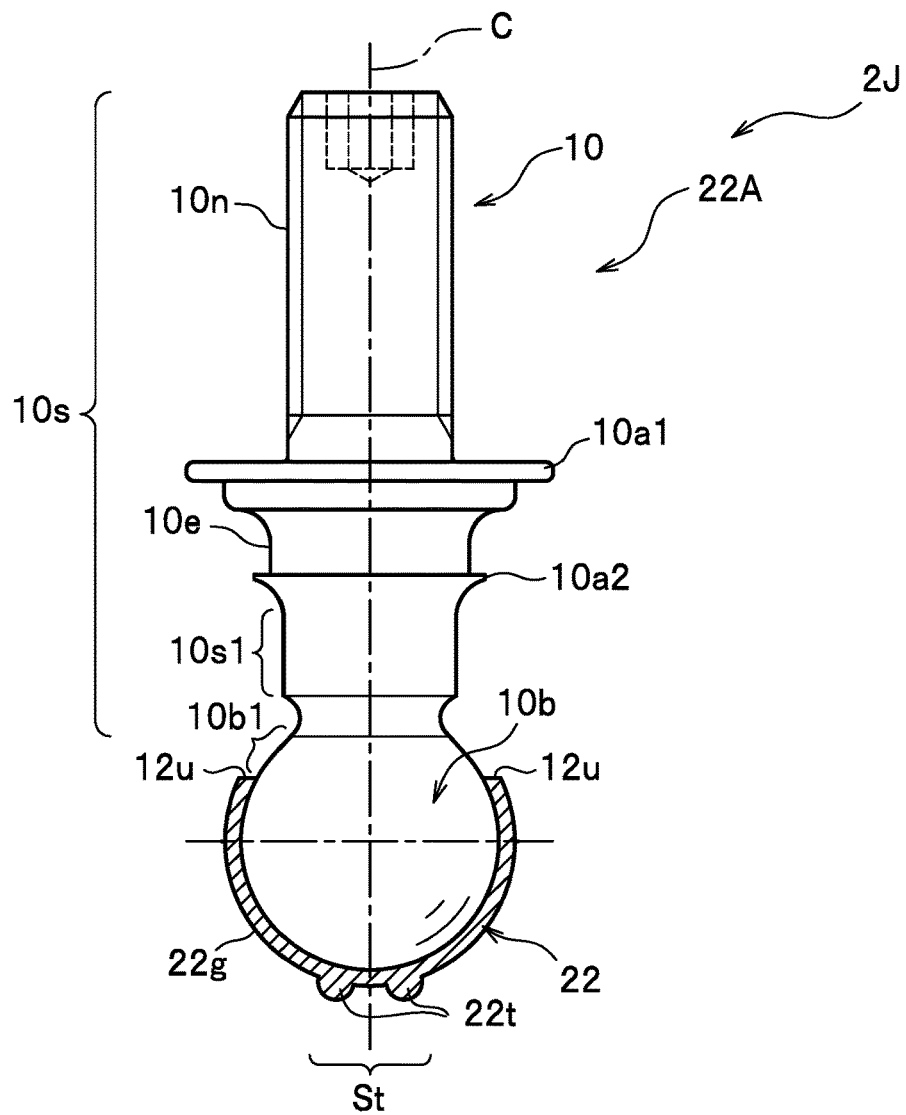
FIG. 8A is an external appearance diagram of the ball stud in a state where a ball sheet is attached to the ball stud in Embodiment 2, and includes a cross section of the ball sheet.
Figure 8B:
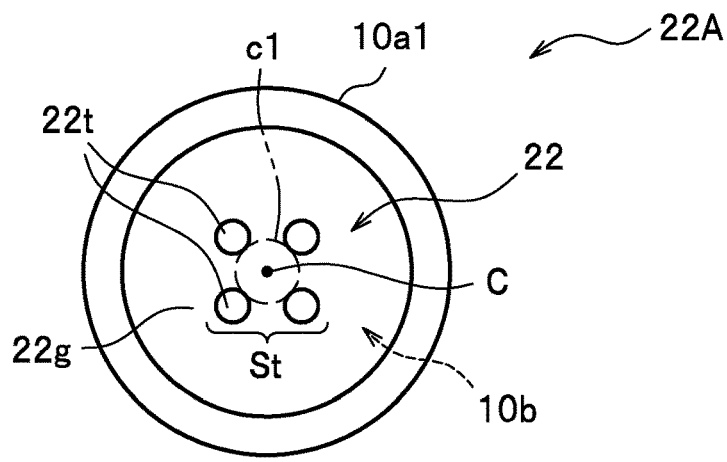
FIG. 8B is a bottom diagram of the ball sheet in the state where the ball sheet is attached to the ball stud in Embodiment 2.

FIGS. 8A and 8B are an external appearance diagram and a bottom diagram both illustrating how a ball sheet is attached to the ball stud in Embodiment 2. FIG. 8A includes a cross section of the ball sheet.

In a ball joint 2J according to Embodiment 2, leg-shaped protrusions (uneven parts) 22*t* are formed on a bottom part St of the ball sheet 22.

The bottom part St is an area in the ball sheet 22 near the south pole Sm0 of the ball stud 10. In other words, the bottom part St is an area of the ball sheet 22 near the axis C.

The rest of the configuration of Embodiment 2 is the same as that of Embodiment 1. The same configuration components will be denoted by the same reference signs, and detailed descriptions for them will be omitted.

In the ball sheet 22 according to Embodiment 2, multiple leg-shaped protrusions 22*t* are provided to the bottom part St. The "leg-shaped" of the leg-shaped protrusions 22*t* means having legs with which a ball sheet assembly 22A stands on a workbench or the like without external assistance.

The number of leg-shaped protrusions 22*t* is two or more. In a case where the ball sheet assembly 22A is intended to stand on the workbench or the like without external assistance, the number of leg-shaped protrusions 22*t* is three or more. In this respect, a condition required for the leg-shaped protrusions 22*t* to enable the ball sheet assembly 22A to stand on the workbench or the like without external assistance is that three or more leg-shaped protrusions 22*t* are arranged in an area subtending an angle greater than 180°.

Embodiment 2 shows a case where as illustrated in FIG. 8B, four leg-shaped protrusions 22*t* are formed around the axis C at intervals of 90°.

The height of the leg-shaped protrusions 22*t* may be 1.5 mm or less because the bottom part St does not influence the rotational torque (see the arrow α2 in FIG. 1). Incidentally, the height of the leg-shaped protrusions 22*t* may be greater than 1.5 mm, depending on the diameter of the ball part 10*b*, the thickness of the ball sheet 22, and the like.

It is desirable that the leg-shaped protrusions 22*t* be hemispherically-shaped, cylindrically-shaped or the like, but they may be angularly-shaped. In the case where the leg-shaped protrusions 22*t* are hemispherically-shaped, cylindrically-shape, angularly-shaped or the like, the diameter of a circumscribed circle c1 on a bottom view illustrated in FIG. 8B is 3.0 mm or less. Incidentally, the diameter of the circumscribed circle c1 may be greater than 3.0 mm, depending on the diameter of the ball part 10*b*, the thickness of the ball sheet 22, and the like.

The leg-shaped protrusions 22*t* are formed using molds similar to the lower mold Ka and the upper first and second molds Kb, Kc as the two halves of the split mold which are illustrated in FIGS. 6A and 6B for Embodiment 1.

The leg-shaped protrusions 22*t* are formed using the lower mold Ka to be removed downward. For this reason, it is made sure that each leg-shaped protrusion 22*t* has no horizontal undercut from an outer surface 22*g* of the ball sheet 22 formed around the ball part 10*b*.

In the case where three or more leg-shaped protrusions 22*t* are formed on the bottom part St of the ball sheet 22, the ball sheet assembly 22 can be made to stand on the workbench or the like without external assistance. Thereafter, the housing 11 is insert-molded with the ball part 10b of the ball stud 10, around which the ball sheet 22 is formed, inserted as the core.

The housing 11 is molded in close contact with the outer surface 22g and the leg-shaped protrusions 22t of the ball sheet 22. During the molding of the housing 11, the resin of the housing 11 surrounds the multiple leg-shaped protrusions 22t of the ball sheet 22 to forms anti-rotation recessed parts in the inner surface 11n of the housing 11.

The above-discussed configuration can increase the joining strength between the ball sheet 22 and the housing 11 since: as illustrated in FIGS. 8A and 8B, the leg-shaped protrusions 22t are formed on the bottom part St of the ball sheet 22; and the leg-shaped protrusions 22t are fitted into the anti-rotation recessed parts (not illustrated) of the housing 11. The configuration, therefore, is capable of preventing the ball sheet 22 from sliding over the housing 11 and being displaced relative to the housing 11.

Incidentally, if projecting or recessed parts were formed on the ball sheet 22 to make the thickness of the ball sheet 22 vary to a large extent between areas where the projecting or recessed parts are formed and areas where no projecting or recessed parts are formed, the molding shrinkage differences between them would become larger to make the inner surface of the ball sheet 22 wavy. This would accordingly make the sliding resistance uneven between the ball sheet 22 and the ball part 10b. In contrast, in the configuration of Embodiment 2, the leg-shaped protrusions 22t are located on the bottom part St of the ball sheet 22. The configuration, therefore, makes it possible to form the support part Ss near the equatorial part S in the shape close to a true sphere, and enables the ball part 10b to smoothly slide over the ball sheet 22.

Embodiment 3

Figure 9:
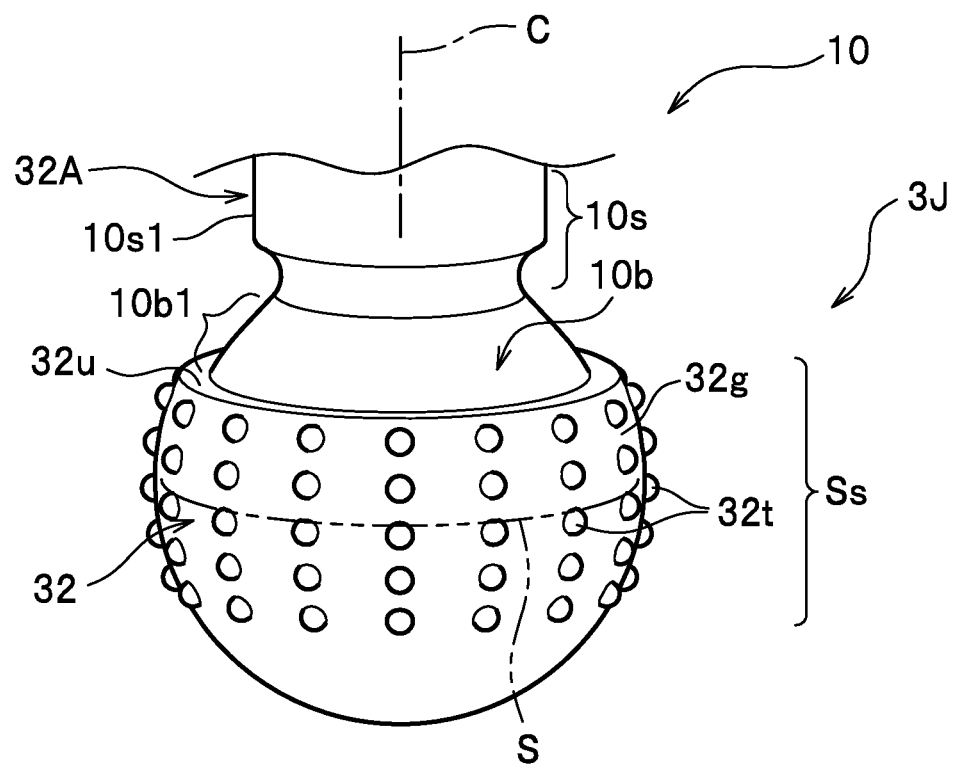
FIG. 9 is a perspective diagram illustrating the ball part of the ball stud with a ball sheet formed around the ball part in Embodiment 3, and the vicinity of the ball part

FIG. 9 is a perspective diagram illustrating the ball part of the ball stud with a ball sheet formed around the ball part in Embodiment 3, and the vicinity of the ball part.

In a ball sheet assembly 32A according to Embodiment 3, multiple anti-rotation projecting parts (uneven parts) 32t each in a projecting shape are formed in the support part Ss of the ball sheet 32. The projecting parts 32 are arranged in the longitudinal and latitudinal directions of the ball part 10b.

The rest of the configuration of Embodiment 3 is the same as that of the Embodiment 1. The same elements are denoted by the same reference signs, and detailed descriptions for them are omitted.

The insert-molding of the ball sheet 32 around the ball part 10b is achieved by holding the ball part 10b between left and right halves of a split mold To put it specifically, as illustrated in FIG. 9, the ball sheet 32 is insert-molded from, for example, POM by holding the ball part 10b of the produced ball stud 10 between the left and right halves of the split mold with the ball part 10b inserted as the core in the split mold while lifting the ball stud 10 upward for the purpose of preventing leakage of the resin. Thereby, the ball sheet assembly 32A including the anti-rotation projecting parts 32t each in the projecting shape is formed on the support part Ss.

Thereafter, the housing 11 is insert-molded with the ball part 10b, around which the ball sheet 32 including the anti-rotation projecting parts 32t each in the projecting shape on the support part Ss is formed, and the distal end part 1a1 of the support bar 1a both being inserted as the cores (see FIG. 1).

The resin flows in between the multiple anti-rotation projecting parts 32t on the support part Ss of the ball sheet 32 to form the multiple anti-rotation recessed parts 11o in the housing 11. Thereby, the anti-rotation projecting parts 32t are fitted into the anti-rotation recessed parts 11o.

The above-discussed configuration reinforces the joining or bonding strength between the ball sheet 32 and the housing 11 since: as illustrated in FIG. 9, the anti-rotation projecting parts 32t in the projecting shape are formed on the support part Ss of the ball sheet 32; and the anti-rotation projecting parts 32t are fitted into the anti-rotation recessed parts (not illustrated) of the housing 11.

Particularly, since the anti-rotation projecting parts 32t of the ball sheet 32 and the fitted anti-rotation recessed parts 11o are located in the support part Ss existing on the two sides of the equatorial part S, their rotational torque arms from the axis C when the ball stud 10 rotates are longer than otherwise. Thus, since the anti-rotation projecting parts 32t and the fitted anti-rotation recessed parts 11o are located in the support part Ss, larger resistance torques can be caused in response to the rotational torques around the axis C of the ball stud 10.

Furthermore, since the anti-rotation projecting parts 32t are located on the support part Ss substantially vertical to the external force F1 (indicated with the outlined arrow in FIG. 7) which causes the elastic lift, the direction in which the anti-rotation projecting parts 32t are fitted into the anti-rotation recessed parts 11o is substantially vertical to the external force F1, and their resistance to the external force F1 is larger than otherwise.

Accordingly, the ball sheet 32 is less likely to slide over the housing 11, and to be displaced relative to the housing 11 when the rotational torque (indicated with the arrow α2 in FIG. 1) is applied to the ball stud 10, as well as when the external force F1 (indicated with an outlined arrow in FIG. 7) which causes the elastic lift is applied to the ball stud 10.

Moreover, the recessed parts are formed in the mold. The recessed parts can be formed by machining the corresponding grooves in the mold, and the mold is easy to produce.

Besides, while the ball sheet 32 is being molded, the ball stud 10 is lifted upward, and the stud vicinity part 10b1 of the ball part 10b thus comes into close contact with the upper spherical surface part of the mold. This inhibits the resin for molding the ball sheet 32 from leaking upward from an upper end 32u to an area where the ball sheet 32 need not be molded.

Although Embodiment 3 has been discussed citing the multiple anti-rotation projecting parts 32t each in the projecting shape in FIG. 9, the shape of the projecting parts 32t is arbitrary as long as the projecting parts 32t have a projecting shape. Alternatively, multiple anti-rotation recessed parts each in a recess shape may be provided instead of the anti-rotation projecting parts 32t. Otherwise, both the multiple anti-rotation projecting parts 32t and the multiple anti-rotation recessed parts each in a recess shape may be provided. Incidentally, the shape of the anti-rotation recessed parts and the shape of the anti-rotation projecting parts 32t may be arbitrarily selected.

In addition, although Embodiment 3 has been discussed citing the multiple anti-rotation projecting parts 32t each in the projecting shape, at least either line-shaped line protrusions extending in the latitudinal direction or line-shaped line protrusions extending in the longitudinal direction, as illustrated in FIGS. 5A to 5D, may be formed in the support part Ss. Alternatively, the line protrusions in the support part Ss may be each formed extending in a direction other than the latitudinal and longitudinal directions. Otherwise, instead of the line protrusions, line recessed parts each in a recessed shape may be formed extending in the latitudinal direction, in the longitudinal direction, or in a direction other than the latitudinal and longitudinal directions.

Other Embodiments

1. The line protrusions 12t1, 12t2 each in the linear and projecting shape according to Embodiment 1 and the leg-shaped protrusions 22t each in the leg-like and projecting shape according to Embodiment 2 may be instead formed in a recessed shape, or with a configuration which includes a projecting shape and a recessed shape in combination.

2. The line protrusions 12t1, 12t2 each in the projecting shape according to Embodiment 1 and the leg-shaped protrusions 22t according to Embodiment 2 may be formed extending in the latitudinal direction, in the longitudinal direction, or in a direction tilting to the latitudinal or longitudinal direction. Their forming directions are arbitrary.

3. The multiple anti-rotation projecting parts 32t and the multiple anti-rotation recessed parts according to Embodiment 3 may be formed in the southern hemisphere Sm. This formation is preferable because the formation enables the mold to be pulled downward after the molding 4. The line protrusions 12t1, 12t2 each in the linear and projecting shape according to Embodiment 1 and line protrusions each in a recessed shape may be formed in the bottom part St. This formation makes it possible to form the support part Ss into a shape close to a true sphere, and enables the ball part 10b to smoothly slide over the ball sheet 22.

5. Although the foregoing descriptions have been provided for Embodiments 1 to 3 in which the ball sheet and housing both are made from resin, the ball sheet may be made from resin while the housing is made from metal such as an aluminum alloy. Otherwise, materials of the ball sheet and the housing may be arbitrarily selected.

6. Embodiments 1 to 3 have discussed the various configurations. These configurations may be combined depending on the necessity to create another configuration.

The configurations discussed in Embodiments 1 to 3 show examples of the present invention. Various modified modes and various specific modes may be carried out within a scope not departing from the gist and spirit of the present invention which are described in claims.

The ball joint according to the present invention is widely applicable to: industrial robots to be used for production automation, factory automation (FA) and the like; joint parts of robot arms of humanoid robots and the like to be used in medical care sites, nuclear power plants, and the like; apparatuses included in industrial vehicles, such as excavators and crane vehicles, and having arms which rotate at joint parts; and structures of joint parts between mechanical components, for example, a joint part between a link and an arm.

REFERENCE SIGNS LIST 1 stabilizer link
1a support bar
10 ball stud
10b ball part
10s stud part
11, 21, 31 housing
11o anti-rotation recessed part (recessed fitting part)
12, 22, 32 ball sheet
12t line protrusion (projecting part)
32t anti-rotation projecting part (projecting part)
21t, 31t anti-rotation projecting part (projecting fitting part)
22t leg-shaped protrusion (projecting part)
C axis
J, 2J, 3J ball joint
S equatorial part
Sm southern hemisphere
Ss support part
St bottom part

The invention claimed is:

1. A ball joint assembly comprising:
a ball stud including:
a stud part to be linked to a structure body on an end portion side; and
a ball part on an opposite end portion side;
a housing swingably and rotationally supporting the ball part of the ball stud; and
a ball sheet arranged between the housing and the ball part,
wherein:
the ball part is slidable over the ball sheet,
the ball sheet includes a plurality of uneven parts, each including at least one of a recessed part and a projecting part on a surface facing the housing,
the housing includes a fitting part in at least one of projecting and recessed shapes, which is fitted to the plurality of uneven parts,
the plurality of uneven parts are circular,
the plurality of uneven parts are arranged along a meridian direction of the ball with a space between each, and
the plurality of uneven parts have a thickness which becomes larger toward an axis of the ball stud on the opposite end portion side.

2. The ball joint assembly according to claim 1, wherein the plurality of uneven parts are arranged in a support part of the ball sheet.

3. The ball joint assembly according to claim 1, wherein the plurality of uneven parts are arranged in a bottom part of the ball sheet.

4. The ball joint assembly according to claim 1, wherein the plurality of uneven parts are arranged in a southern hemisphere of the ball sheet.

5. The ball joint assembly according to claim 1, wherein the plurality of uneven parts are arranged in a parallel direction of the ball part.

6. The ball joint assembly according to claim 1, further comprising:
a stabilizer link for linking a suspension and a stabilizer in a vehicle; and
a bar-shaped support bar, the ball joint assembly being formed in an end portion of the support bar in a longitudinal direction of the support bar,
wherein the bar joint assembly is connected to the suspension or the stabilizer.

* * * * *